(12) United States Patent
Ramsden et al.

(10) Patent No.: US 8,319,188 B2
(45) Date of Patent: Nov. 27, 2012

(54) GAMMA-RAY DETECTOR

(75) Inventors: David Ramsden, Southampton (GB); Christopher David Henry Burt, Southampton (GB)

(73) Assignee: Symetrica Limited, Southampton, Hampshire (GB)

( * ) Notice: Subject to any disclaimer, the term of this patent is extended or adjusted under 35 U.S.C. 154(b) by 486 days.

(21) Appl. No.: 12/375,918

(22) PCT Filed: Jul. 19, 2007

(86) PCT No.: PCT/GB2007/002733
§ 371 (c)(1), (2), (4) Date: Apr. 21, 2009

(87) PCT Pub. No.: WO2008/015382
PCT Pub. Date: Feb. 7, 2008

(65) Prior Publication Data
US 2009/0309032 A1  Dec. 17, 2009

(30) Foreign Application Priority Data
Aug. 4, 2006  (GB) .................................. 0615532.9

(51) Int. Cl.
*G01T 1/20* (2006.01)
*H01L 27/146* (2006.01)
(52) U.S. Cl. ................................................. 250/370.09
(58) Field of Classification Search .............. 250/361 R, 250/370.11
See application file for complete search history.

(56) References Cited

U.S. PATENT DOCUMENTS

| | | | | |
|---|---|---|---|---|
| 3,777,161 A | * | 12/1973 | Lee ........................... | 250/361 R |
| 6,058,323 A | * | 5/2000 | Lemelson ..................... | 600/408 |
| 6,587,710 B1 | * | 7/2003 | Wainer ......................... | 600/427 |
| 6,643,538 B1 | * | 11/2003 | Majewski et al. ............. | 600/436 |

(Continued)

FOREIGN PATENT DOCUMENTS
EP  1596223  11/2005
(Continued)

OTHER PUBLICATIONS
"Development of a Directional Gamma Ray Probe", Larsson et al.; 2005 IEEE Nuclear Science Symposium Conference Record; pp. 16-18.

*Primary Examiner* — David Porta
*Assistant Examiner* — Casey Bryant
(74) *Attorney, Agent, or Firm* — O'Melveny & Myers LLP

(57) ABSTRACT

A portable gamma-ray detector for indicating the intensity of a source of gamma-rays, the nature of the source, and the direction to the source relative to an axis of the detector. The detector comprises a plurality of scintillation bodies arranged around the pointing axis, for example four scintillation bodies in a two-by-two array and separated from each other by aluminum foil. Thus gamma-rays from different directions are shielded from different ones of the scintillation bodies by the other scintillation bodies. The scintillation bodies are coupled to respective photo-detectors and a processing circuit is configured to receive output signals from the photo-detectors and to provide an indication of the direction to a source relative to the pointing axis of the detector based on the relative output signals from the different photo-detectors. The processing circuit is further operable to determine the intensity of the source from the magnitudes of the output signals, and the nature of the source from a spectral analysis of the output signals.

14 Claims, 4 Drawing Sheets

U.S. PATENT DOCUMENTS

| | | | |
|---|---|---|---|
| 7,193,208 B1 * | 3/2007 | Burr et al. | 250/300 |
| 2003/0081716 A1 * | 5/2003 | Tumer | 378/19 |
| 2005/0121618 A1 | 6/2005 | Fowler, Jr. et al. | |
| 2008/0048123 A1 * | 2/2008 | Larsson et al. | 250/363.01 |
| 2008/0130837 A1 * | 6/2008 | Heath et al. | 378/205 |
| 2009/0271143 A1 | 10/2009 | Shirakawa et al. | |

FOREIGN PATENT DOCUMENTS

| | | |
|---|---|---|
| EP | 1956392 | 8/2008 |
| WO | WO02/31536 | 4/2002 |

* cited by examiner

GAMMA-RAY DETECTOR

BACKGROUND ART

The invention relates to gamma-ray detection, and in particular to gamma-ray detection for determining the direction to a source of gamma-rays.

There are a number of situations in which it can be important to be able to quickly determine the level of radiation in the environment, the nature of the isotope producing the radiation, and the direction from which the radiation is coming. For example, this information can be of great benefit to emergency staff entering a 'disorganised' nuclear environment, for screening personnel and cargo in order to police the illicit trafficking of radioactive materials, and for general searching for 'orphaned' sources of radiation.

Gamma-ray detectors with the ability to measure the intensity of radiation in the environment and to identify the nature of the source emitting the radiation (from spectroscopic information) are widely available, for example the GR-135 Explo-ranium® from the SAIC Corporation. However, to determine the direction to the source using these detectors the user must rely on dose-rate trends. This is done by moving the detector and noting how the measured intensity changes. An increase in measured intensity indicates the motion is towards the source. A decreases in measured radiation indicates the motion is away from the source. The location of the source may thus be found by trial and error. A problem with this approach is than it can be slow and unreliable, and so results in an increased radiation exposure to the user seeking to identify the source.

FIG. 1 schematically shows in section view a known hand-held gamma-ray detector 2 capable of determining the intensity, nature and direction of a radioactive source [1]. The detector 2 comprises a spectrometer component 4 and a separate direction finding component 6. The detector 2 is powered by batteries 8 and includes a dock 10 for receiving a personal data assistant (PDA) type device 12 configured to control the detector and display results to a user.

The spectrometer component 4 is responsible for determining the intensity of radiation in the environment and its spectrum. From the spectrum, the nature of the source can be determined. The spectrometer component 4 comprises a conventional small-volume Cerium-doped Lanthanum Bromide (LaBr3(Ce)) crystal scintillator coupled to a photo-multiplier tube.

The direction finding component 6 is responsible for determining the direction from which the radiation in coming, and hence the direction to the source. The direction finding component 6 comprises a cluster of four Geiger-Muller tubes separated from one another by lead shielding. The count rates in the Geiger-Muller tubes which are shielded from the source by the lead shielding will be lower. Accordingly, the direction to the source can be determined from the relative count rates seen in the Geiger-Muller tubes. Experiments have shown that the detector 2 shown in FIG. 1 is capable of localising a 130 millicurie Cesium-137 source at a distance of 2 m (resulting in a dose rate of around 180 µSv/hr at the detector) to within +/−7.5 degrees.

Although the detector 2 shown in FIG. 1 is able to provide useful information regarding the intensity, nature and direction of a gamma-ray source, it has some drawbacks. For example, the direction finding component 6 requires lead shielding and this makes the detector relatively heavy. This can be particularly important for a hand-held detector because the increased weight means it becomes less wieldy, especially if it is to be held for long periods. Furthermore, the direction finding component 6 takes up space in the detector housing. This means for a given characteristic size of detector, e.g., a size that can be comfortably hand held, there is less space available for the spectrometer component than there would be in a dedicated hand-held spectrometer. This can be a problem because the sensitivity of a scintillator-based spectrometer is closely tied to the volume of the scintillator material used. Accordingly, the limited space available for the spectrometer component 4 in the detector shown in FIG. 1 means the detector is overall less sensitive to radiation compared to a dedicated spectrometer having a similar characteristic size. Furthermore still, the inclusion of the separate direction finding component 6 adds to the overall complexity of the detector, for example because a separate high voltage supply and processing circuitry for the Geiger-Muller tubes are required.

There is therefore a need for a gamma-ray detector that enables a user to quickly determine the level of radiation in the environment, the nature of the isotope producing the radiation, and the direction from which the radiation is coming, but which is less complex and can be made lighter and less bulky than the detector 2 shown in FIG. 1.

SUMMARY OF THE INVENTION

According to a first aspect of the invention there is provided a portable gamma-ray detector for indicating the direction to a source of gamma-rays, the detector comprising: a plurality of scintillation bodies respectively coupled to a corresponding plurality of photo-detectors, wherein the scintillation bodies are arranged around a pointing axis of the detector so that in use gamma-rays from different directions away from the pointing axis preferentially interact with different ones of the scintillation bodies; a processing circuit operable to receive output signals from the photo-detectors and to provide an indication of the direction to a source relative to the pointing axis of the detector based on the output signals, and a display screen, wherein the processing circuit is operable to display a graphical indication of the direction to a source relative to the pointing axis of the detector on the display screen, the graphical indication comprising a plurality of geometric shapes having sizes determined according to the output signals from the photo-detectors.

The processing circuit may be further operable to provide an indication of the intensity of a source based on the magnitudes of the output signals and, furthermore still, to generate one or more energy loss spectra from the output signals and perform a spectral analysis of the one or more energy loss spectra, and to identify the nature of the source based on the spectral analysis.

Thus a simple detector is provided that is able to determine the intensity, nature and direction of a source of gamma-rays using the same group of detection elements, namely the scintillation bodies. Accordingly, the detector does not require a separate direction finding component, and is thus able to include comparatively more scintillation material than would be possible in a detector of comparable characteristic size but including a direction finding components. Thus detectors according to embodiments of the invention are able to determine the direction to a source, while maintaining the sensitivity of similarly sized dedicated scintillator spectrometers In principle, the indication of the direction to the source could be given in terms of angular coordinates, e.g. relative to the pointing axis. However, it is envisaged that the detector will often be used in a hand-held applications. In cases such as this, it may be sufficient to provide an indication that the source is generally towards a given side of the pointing axis of the detector. Thus the user can adjust the direction of the pointing axis of the detector by rotating it in the indicated direction. The user can continue to do this until the detector indicates that the output signals from the photo-detectors are substantially the same (possibly following appropriate normalisation if the scintillation bodies are not of comparable sizes). This is taken to mean pointing axis is directed towards the source since it suggests each of the scintillation bodies are presenting comparable orientations to the source with none of the being preferentially shielded. Thus the scintillation bodies will each absorb similar numbers of gamma-rays form the source and so give rise to similar output signals from the photo-detectors.

The detector may further comprise a light source, e.g. a laser diode or collimated white light source, for outputting a beam of light along the pointing axis of the detector. Thus when the detector is pointing at the source, the nearest object to the detector can be illuminated by the light beam. In some cases the illuminated object will be the source itself, in other cases the illuminated object will be something hiding the source. The light source may be on at all times the detector is in use, or may be switched on at the option of a user, for example when the detector indicates it is pointing at the source. In some embodiments having a light source, the processing circuit may be configured to activate the light source when it determines that the pointing axis is aligned with the source (i.e. when the output signals associated with all of the scintillation bodies are comparable).

The display screen may also display the intensity of the radiation being received, as determined by the processing circuit based on the magnitudes of the output signals, and the nature of the radiation being received, as determined by the processing circuit based on a spectral analysis of the of the output signals.

Thus a user can readily identify the intensity, nature and direction to a source of radiation so that he can quickly and fully assess the risk he is presented with.

Because the graphical indication comprises a plurality of geometric shapes having sizes determined according to the output signals from the photo-detectors, a user can intuitively assess which of the scintillation bodies is absorbing the greatest amount of radiation, and hence quickly determine to which side of the pointing axis the source is located.

The direction to a source within a given plane can be determined using only two scintillation bodies. Three scintillation bodies are enough to allow the direction to the source to be determined in three-dimensions. However, in some embodiments the gamma-ray detector consists of four scintillation bodies arranged in a two-by-two array about the pointing axis. This allows the direction to a source to be determined within three-dimensions using a simple configuration that makes efficient use of the volume available for the scintillation bodies.

The scintillation bodies in this arrangement may be square in cross-section in a plane perpendicular to the pointing axis of the detector since this allows them to be closely packed. A layer of optically opaque material, such as a metallic foil, may be provided between the scintillation bodies to reduce optical crosstalk between them.

The scintillation bodies maybe of any type suitable for use in gamma-ray spectrometers, and similarly, any appropriate photo-detectors may be used, e.g. photomultiplier tubes, or silicon photo-multipliers.

According to a second aspect of the invention there is provided a method of obtaining an indication of the direction to a source of gamma-rays, the method comprising; providing a plurality of scintillation bodies arranged around a pointing axis so that gamma-rays from different directions away from the pointing axis preferentially interact with different ones of the scintillation bodies; obtaining output signals from a plurality of photo-detectors coupled to respective ones of the plurality of scintillation bodies; and providing a graphical indication of the direction to the source relative to the pointing axis based on the output signals, wherein the graphical indication comprises a plurality of geometric shapes having sizes determined according to the output signals from the photo-detectors.

BRIEF DESCRIPTION OF THE DRAWINGS

For a better understanding of the invention and to show how the same may be carried into effect reference is now made by way of example to the accompanying drawings in which.

DETAILED DESCRIPTION

Figure 1:
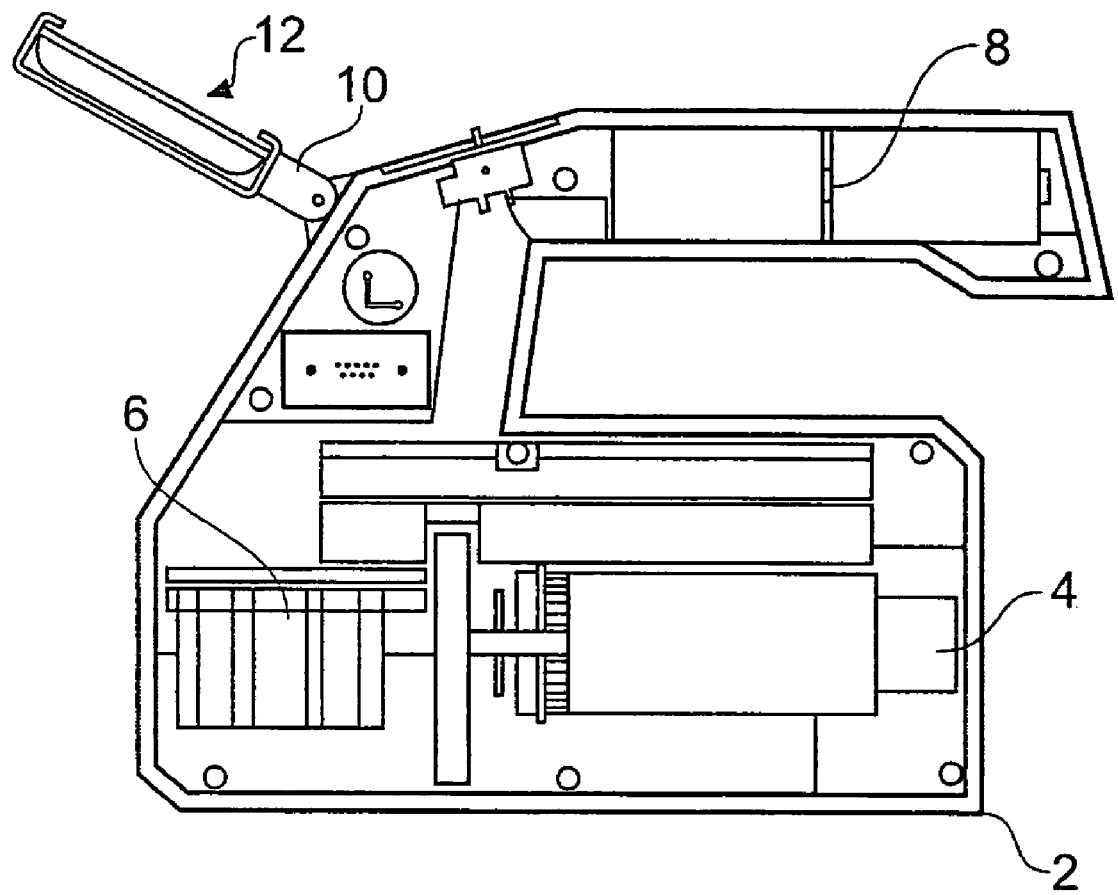
FIG. 1 schematically shows a section view of a known gamma-ray detector for determining the intensity, nature and direction of a gamma-ray source.
Figure 2:
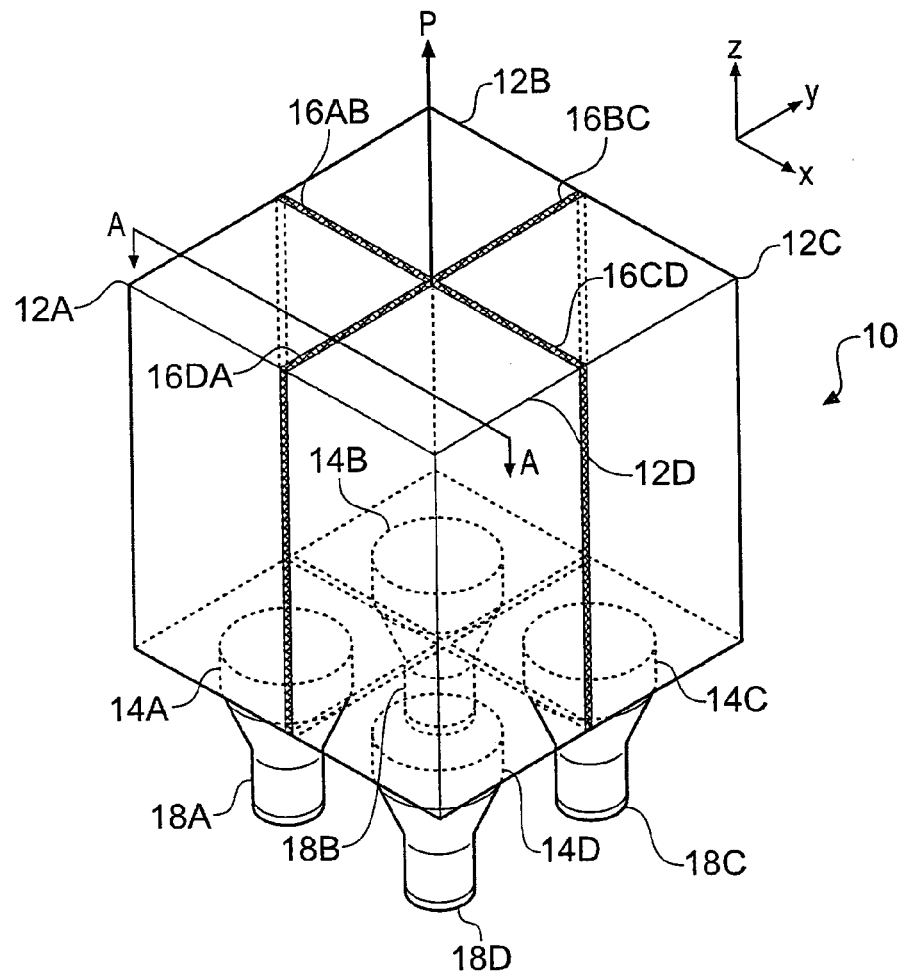
FIG. 2 schematically shows in perspective view a gamma-ray detector according to an embodiment of the invention.
Figures 3A, 3B:
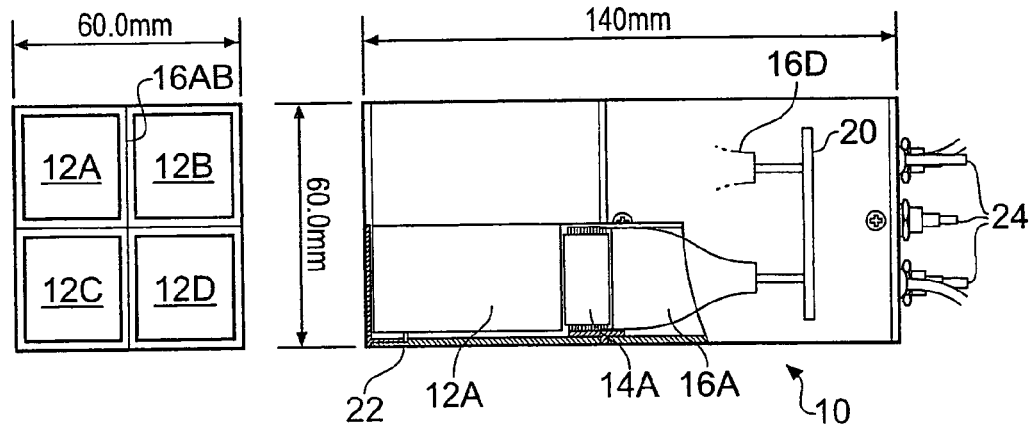
FIGS. 3A and 3B show alternate views of the gamma-ray detector shown in FIG. 2.

FIG. 2 schematically shows in perspective view a gamma-ray detector 10 for determining the direction to a gamma-ray source according to an embodiment of the invention. FIG. 3A schematically shows a plan view of the uppermost surface of the detector 10 shown in FIG. 2. FIG. 3B schematically shows a partial section view of the detector 10 taken along the section AA shown in FIG. 2. The orientation of a Cartesian coordinate system used to describe some aspects of the detector is shown to the top-right of FIG. 2.

The detector 10 comprises first, second, third and fourth Thallium-doped Sodium Iodide (NaI(Tl)) crystal scintillation bodies 12A-D. The four scintillation bodies are of generally square cross-section in the xy-plane and are arranged adjacent to one another in a two-by-two square array. Each scintillation body is separated from its two immediate neighbouring scintillation bodies by layers of aluminium foil. Thus, a first layer of aluminium foil 16AB is arranged between the adjacent faces of the first and second scintillation bodies 12A, 12B. A second layer of aluminium foil 16BC is arranged between the adjacent faces of the second and third scintillation bodies 12B, 12C. A third layer of aluminium foil 16CD is arranged between the adjacent faces of the third and fourth scintillation bodies 12C, 12D. A fourth layer of aluminium foil 16DA is between the adjacent faces of the fourth and first scintillation bodies 12D, 12A. Thus each scintillation body is optically isolated from each of the other scintillation bodies.

The four scintillation bodies 12A-12D are individually coupled to respective ones of four photo-multiplier tubes (PMTs) 18A-18D via one of four light guides 14A-14B in the conventional manner. In use, the four PMTs 18A-18D provide respective output signals $S^{A-D}$ indicative of the amount of energy deposited in each of the scintillation bodies. The output signals $S^{A-D}$ are received by a processing circuitry 20 (not shown in FIG. 2). The processing circuitry 20 is configured to generate energy loss spectra based on the signals from the PMTs and to perform further processing as described below. The processing circuitry may be specific to the detector, or may be provided by a suitably programmed general purpose computer, for example, a personal data assistant (PDA) type device, coupled to the detector.

The detector is also provided with a display screen (not shown), for example a liquid crystal display (LCD) screen for displaying information to a user. In embodiments where the processing circuitry is provided by a general purpose computer, the display screen may also be a part of the general purpose computer.

The above-mentioned elements of the detector 10 are mounted in an aluminium housing 22 (not shown in FIG. 2). Electrical connections 24 through the housing 22 are provided for supplying power to, and receiving signals from, the detector. The characteristic size of the detector is such that the housing 22 has an overall length along its central axis P (parallel to the z-axis of the Cartesian coordinate system) of 140 mm, and a width of 60 mm in both the x- and y-directions. Thus the detector has an overall volume of around 0.5 liters. For hand held use, an overall volume of less than 1, 2, 3, 4 or 5 liters may be appropriate, and an overall mass of less than 1, 2, 3, 4 or 5 kilograms may be appropriate. The central axis P of the detector may be considered a "pointing axis" such that if the central axis P is directed towards a given location, the detector may be said to be pointing towards that direction.

Although not shown in the figures, the housing may be provided with a handle to allow convenient hand-held operation.

Figure 4:
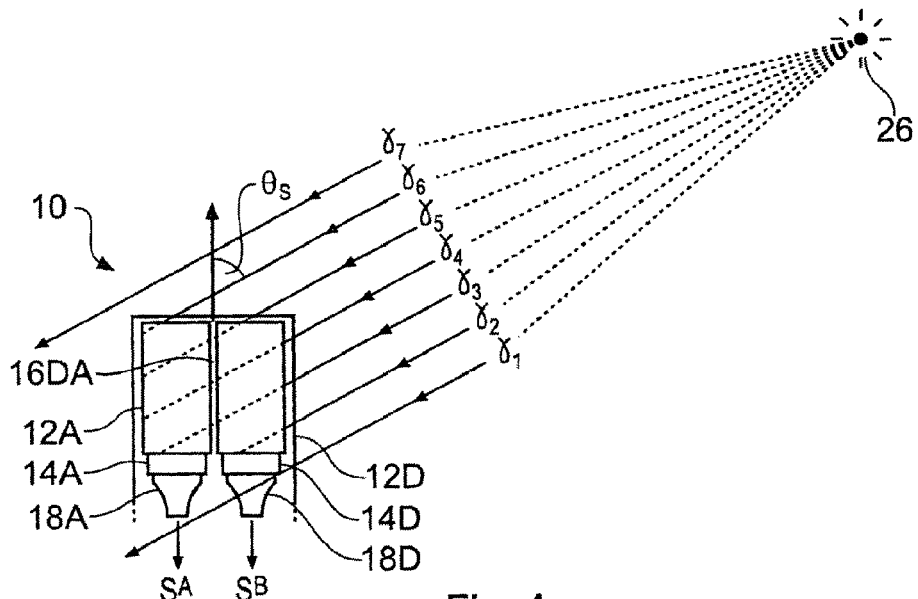
FIG. 4 shows a section view of the gamma-ray detector shown in FIG. 2 in use.

FIG. 4 schematically shows a part of the detector 10 shown in FIGS. 2, 3A and 3B when in use in the presence of a radioactive source 26. FIG. 4 shows the detector in the same section view as shown in FIG. 3B, although in FIG. 4 the detector is shown rotated through 90 degrees in the plane of the figure compared to FIG. 3B. The direction from the detector 10 to the source 26 can be described in terms of a spherical coordinate system with its origin at the centre of the four scintillation bodies 12A-12D. In this coordinate system co-latitude $\theta$ is measured with respect to the central (pointing) axis P of the detector 10, and azimuth $\Phi$ is measured from the x-axis of the Cartesian coordinate system shown in FIG. 2 towards the y-axis. Thus the source 26 shown in FIG. 4 has a co-latitude $\theta_s$ of around 45 degrees, and an azimuth $\Phi_s$ of around 0 degrees (i.e., in the plane of the figure).

For ease of representation, the source 26 is assumed to be sufficiently distant from the detector 10 that the gamma-rays can be considered parallel to one another at the detector. However, this is not significant to the operation of the detector. The source 26 emits gamma-rays isotropically and the trajectories of seven example gamma-rays $\gamma$1-7 are shown in FIG. 4. Gamma-rays $\gamma$1 and $\gamma$7 both miss the detector, and will not be detected. Gamma-rays $\gamma$2-6, on the other hand, enter the detector and can lead to gamma-ray interactions within one or more of the scintillation bodies, and so generate photons for detection by the PMTs 18A-18D. Photons generated in one or other of the scintillation bodies are prevented by the layers of aluminium foil from entering the other scintillation bodies. Thus the PMT 18A optically coupled to the first scintillation body 12A will only detect photons generated by gamma-ray interactions within the first scintillation body 12A, and likewise for the other PMTs coupled to the other scintillation bodies. However, the layers of aluminium foil are largely transparent to gamma-rays. Thus, a gamma-ray from the source 26 which enters the fourth scintillation body 12D may go on to enter the first scintillation body 12A if it has not already been fully absorbed and follows an appropriate path (possibly after scattering).

As can be seen from FIG. 4, the majority of the gamma-rays $\gamma$2-6 entering the detector 10 in the plane of the figure initially enter the fourth scintillation body. This is because the fourth scintillation body is on the same side of the central axis of the detector 10 as the source 26. This means more gamma-ray energy will be deposited in the fourth scintillation body than in the first body since the fourth scintillation body 12D in effect acts as a shield between the source 26 and the first scintillation body 12A. Accordingly, more photons will be generated as a result of gamma-ray interactions in the fourth scintillation body than in the first, and the overall count rate seem with the fourth PMT 18D will therefore be higher than that seen with the first PMT 18A.

For a given source azimuth, the extent to which the fourth scintillation body 12D shields the first scintillation body 12A from the source of radiation depends on the co-latitude. For example, when the detector 10 is pointing directly at the source (i.e., co-latitude $\theta_s$=0 degrees), neither scintillation body shields the other, and, all other things being equal, the PMTs will measure comparable signals. Thus the disparity in count rates seen by the different PMTs is a measure how far away the source is from being in line with the pointing axis of the source.

The detector 10 is symmetric about the plane containing azimuth $\Phi$=0 degrees and the pointing axis P (i.e., the xz plane). This means for a source azimuth ($\Phi_s$ of 0 degrees, the response of the third PMT 18C coupled to the third scintillation body 12C is the same as the response of the fourth PMT 18D coupled to the fourth scintillation body 12D (because they present mirror-images of otherwise identical orientations to the source). Similarly, the response of the second PMT 18B coupled to the second scintillation body 12B is the same as the response of the first PMT 18A coupled to the first scintillation body 12A (again because they present comparable mirror-image orientations to the source, and furthermore have similar, though mirror-imaged, shielding).

Accordingly, in cases where the source of radiation to be identified is necessarily confined to an identifiable plane, e.g., on the floor in an outside environment, a detector comprising only two scintillation bodies (as opposed to the four shown in FIG. 2) would be sufficient to allow the direction to the source to be determined. This can be appreciated if one considers that the signals from the first and fourth PMTs shown in FIG. 4 allow the direction to the source to be constrained within the plane of the drawing and the signals from the second and third PMTs are not required to do this because they will be identical to the signals from the first and fourth PMTs. Thus if the plane of the drawing corresponds to a plane to which the source is confined (e.g., the floor in an outdoor space with the detector arranged parallel to the floor), the direction to the source can be determined from only the signals from the first and fourth PMTs. However, the arrangement of four scintillation bodies as shown in FIG. 2 allows (and is more than the minimum required) the direction to a source of radiation to be determined in the more general case that it is not constrained to a single plane, that is to say the use of four scintillation bodies allows the direction to a source to be determined in both azimuth and co-latitude.

FIGS. 5A to 5D schematically show respective simulated energy loss spectra associated with each of the four scintillation bodies 12A-12D for a source located at a co-latitude of 45 degrees and an azimuth of 225 degrees (i.e. roughly in a direction from the centre of the group four scintillation bodies past the upper-outermost corner of the first scintillation body 12A as shown in FIG. 2). Each of the energy loss spectra correspond to a one second integration time in an environment where the dose-rate is of the order 0.5 micro Sieverts and are obtained in the conventional way, i.e., with each scintillation body and associated PMT in effect acting an independent spectrometer.

The integrated number of counts for each of the energy loss spectra are indicated in the respective figures. The sum of the total counts in each of the four energy loss spectra (i.e. 300+172+162+113=747 counts) is a measure of the overall intensity of the radiation at the detector. Thus this provides information on the dose the user is receiving. The count rate may be calibrated into appropriate units as desired in the normal way. This information may be displayed to a user on the display screen of the detector.

The spectral information in the energy loss spectra can be used to identify the nature of the source in the usual way (e.g., by identifying features in the spectra which are characteristic of a given radioactive material). This can be done using conventional techniques, for example spectrum deconvolution such as described in WO 02/031536 [2]. The four energy loss spectra may be processed separately, or after summing. Summing can be useful if the overall count rates are low because summing can help to reduce the statistical noise. Summing will be most effective where the responses of each of the scintillation bodies are first normalised. Normalisation can help to ensure the summed energy loss spectrum is close to that which would be obtained from a spectrometer comprising a single scintillation body with a volume comparable to that of the four scintillation bodies together. This can help to optimise the ability to identify isotopes from the spectrum. However, some processing techniques, e.g. those described in WO 02/031536 [2], take account of the modelled responses of the individual scintillation bodies, and so in these cases it may be preferable for the spectral processing to be performed separately for each detector. This approach also allows gain-stabilisation and energy-calibration to be managed separately.

Thus the spectral information can be used to identify the nature of the source of the radiation. Again, this information can be displayed to a user on the display screen.

Finally, the direction to the source can be estimated from the relative count rates seen in each of the energy loss spectra. This can be done based on the total integrated count rate in each spectra, or for the integrated count rates in a given energy band, and for each case possibly after a threshold has been subtracted. If the background level of radiation in the environment is low, the total integrated count rate may be most useful. However, where a user wishes to identify the direction to a source in an environment where the general level of background radiation is high, the direction may be determined from only the count rates within a given energy band (or energy bands). For example, if the spectral processing indicates that a particular source of interest is present against a high general background level of radiation, and the user wishes to identify the direction to this source, this may be done more reliably by comparing the count rates seen in energy bands centred on the strongest emission lines for the source of interest. However, for simplicity, it is assumed in this example that the background count rate in the environment is low, and so it is the total integrated count rates in each of the energy loss spectra which are used to determine the direction to the source.

Figure 5A:
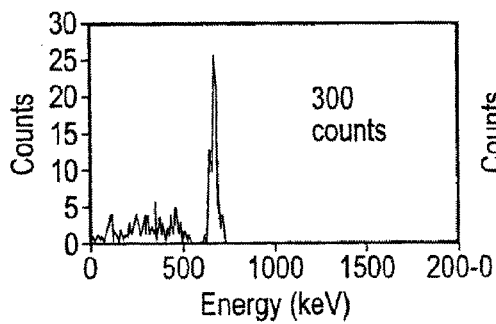
FIGS. 5A to 5D schematically show example energy loss spectra associated with the gamma-ray detector shown in FIG. 2.
Figure 5B:
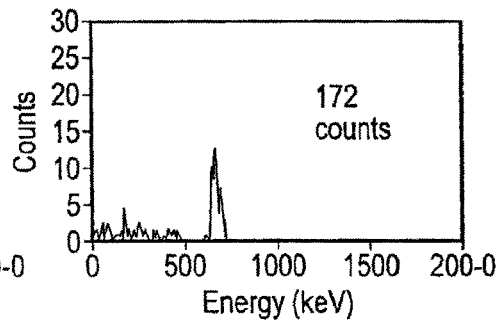
Figure 5C:
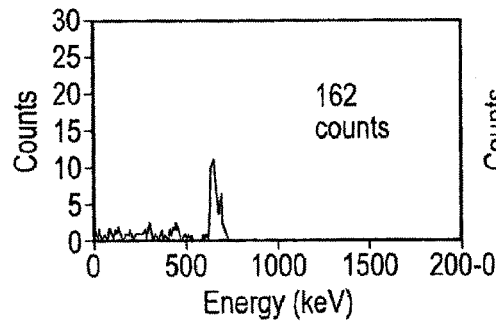

Thus, for the example shown in FIGS. 5A-5D, it is apparent from the similarity in the total count rates seen in FIG. 5B (172 counts), and FIG. 5C (162 counts), that the source is in a direction which is close to azimuth 45 degrees, or 225 degrees. This is because these are the only two directions for which the second and third scintillation bodies associated with these energy loss spectra present the same (though mirror imaged) orientation to the source and have the same amount of shielding. The shielding is either by the first scintillation body 12A (in the case the source is in a direction having an azimuth 225 degrees), or by the fourth scintillation body 12D (in the case the source is in a direction having an azimuth 45 degrees).

Figure 5D:
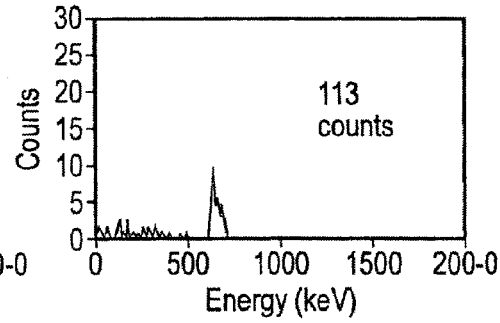

The total count rate in the energy loss spectrum shown in FIG. 5A (300 counts) is higher than the count rate in the energy loss spectrum shown in FIG. 5D (113 counts). This indicates the source is located to the same side of the central axis P of the detector 10 as the first scintillation body 12A. This is because the lower count rate in the fourth scintillation body 12D indicates it is being shielded from the source by the other scintillation bodies. Thus of the two possible azimuthal directions associated with there being similar count rates in the second and third scintillation bodies (i.e. azimuths of 45 degrees or 225 degrees), the higher count rate associated with the first scintillation body means the source azimuth is 225 degrees.

If desired, the co-latitude can be determined from the relative output signals associated with the first and fourth scintillation bodies, for example, based on a look-up table. However, although in principle the direction to the source could be determined in terms of angular coordinates relative to the pointing axis, it is envisaged that the detector will often be used in a hand-held applications where it will be sufficient to provide only an indication that the source is generally towards a given side of the pointing axis of the detector, with an express determination of coordinates for the source not required.

Figure 6A:
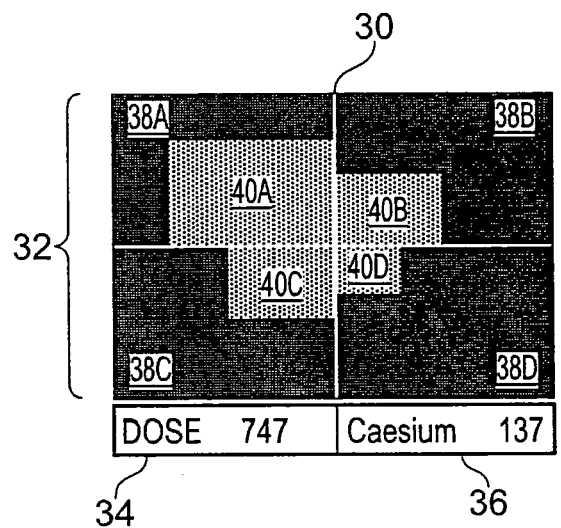
FIGS. 6A and 6B show example screen displays indicating the intensity, nature and direction of a gamma-ray source obtained using the gamma-ray detector shown in FIG. 2.

FIG. 6A schematically shows a display 30 that may be presented to a user on the screen of the detector 10 according to an embodiment of the invention in which an express determination of coordinates for the source is not required. The display comprises a direction display panel 32 for displaying directional information, a dose display panel 34 for displaying information regarding the intensity of radiation at the detector, and a nature display panel 36 for displaying information regarding the nature of the source of the radiation.

The example display shown in FIG. 6A corresponds with what might be seen in the situation associated with the four energy loss spectra shown in FIGS. 5A-5D. Accordingly, the dose display panel 34 indicates the total count rate of 747 counts. The nature display panel 36 indicates Caesium-137 as the source of the radiation. This is determined by the processing circuit in the usual way from the presence of the strong characteristic line at 662 kev in each of the energy loss spectra.

The direction display panel 32 provides a simple graphical indication of the relative count rates associated with four scintillation bodies. Thus the display panel 32 comprises four quadrants 38A-38B respectively associated with the four energy loss spectra determined by the processing circuitry from the output signals from the four PMTs 18A-18D. In each quadrant the corresponding count rate is indicated by a block 40A-40D having a colour contrasting with that of the background. The size of the block is related to the count rate. The count rates represented by the blocks in the direction display panel may be the total integrated count rate in each of the respective energy loss spectra, or may be the count rate integrated over a defined energy band. In the event that the energy loss spectra indicate two isotopes are present, different direction estimates can be obtained for each isotope by making direction estimates based on the count rates seen in the different energy bands associated with the different emissions from each source.

A user viewing the display shown in FIG. 6A is thus able to quickly identify that the first scintillation body 12A is generating more counts than any of the other scintillation bodies, and thus the source is in a direction corresponding to the side of the detector pointing axis on which the first scintillation body is positioned. If the user changes the pointing direction of the detector (i.e. by changing the direction along which the central axis P of the detector 10 is aligned), the relative sizes of the blocks will change because of the changing orientations presented by each scintillation body to the source and the changes in relative shielding.

Figure 6B:
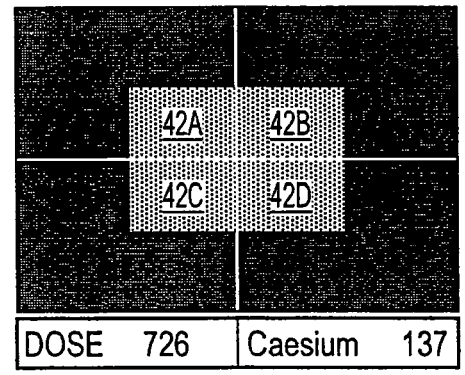

FIG. 6B is similar to and will be understood from FIG. 6A. However, the display shown in FIG. 6B corresponds to the situation that the detector 10 is pointing directly at the source 26. Thus the blocks 42A-42D shown in FIG. 6B are all of the same size. This is because each scintillation body presents a similar orientation to the source, and none of the scintillation bodies are being shielded by the other scintillation bodies.

It is appreciated that the count rates will also be equal in the event that the detector is pointing directly away from the source. However, the PMTs and associated electronics, and for hand-held applications the user's body, will generally shield the scintillation bodies from gamma-rays coming from behind the detector. Accordingly, it will only be when pointing towards a source (as opposed to pointing directly away from it) that significant signals will be detected. Furthermore, the way in which the output signals associated with the different scintillation bodies respond to changes in pointing direction will be different depending on whether the detector is pointing towards the source or whether the detector is pointing away from the source. For example, if the detector is pointing generally towards the source, and is moved to point more to a user's left (i.e. so the source in effect moves to the right of the pointing axis), the scintillation bodies to the right of the pointing axis will show increased signals. If, on the other hand, the detector is pointing generally away from the source, and is moved to point to a user's left, it is the scintillation bodies to the left of the user that will show the increased signals because the radiation is coming from behind. Accordingly, the possibility of any ambiguity can be resolved simply by moving the pointing axis and observing the nature of the changes in the output signals associated with the scintillation bodies.

Nonetheless, if the possible ambiguity is still of concern, an additional scintillation body could be employed towards the front of the detector (i.e. on the top of the detector 10 for the orientation shown in FIG. 2). The count rate from the additional scintillation body will depend on whether the detector is pointing towards the source or pointing away from the source. This is because in the latter case, the additional scintillation body will be shielded from the source by the other scintillation bodies, whereas in the former case it will not be. Thus the relative count rates between the additional scintillation body and the other scintillation bodies may be used to distinguish between pointing towards and pointing directly away from a source. However, a more simple solution is simply to move towards the indicated position when the count rates are found to be equal. If the overall intensity of detected radiation increases, this means the detector is moving towards the source, and thus is pointing at it. In contrast, if the overall intensity decreases, the detector must be pointing away from the source.

Thus, notwithstanding this possible, but easily resolved, ambiguity, a user can readily identify the direction to a source by simply moving the detector until the display panel 32 shows blocks of equal size. Furthermore, the user is guided in how to move the detector 10 because he knows to move it in the direction associated with the quadrant of the display which shows the greatest count rate. When the display shows the blocks to be of broadly similar sizes, the user knows the detector 10 is pointing towards the source 26. To assist in identifying where the detector is pointing, a beam of light (e.g. from a laser diode) may be aligned with the central pointing axis of the detector. Thus when the detector is pointing at the source, the beam of light illuminates the nearest object to the detector that is on the pointing axis.

It will be understood that other techniques may be used to indicate to a user the relative count rates associated with the four scintillation bodies. For example, a scheme based on colour rather than block size may be used (e.g. red indicates high counts for a given quadrant, and blue indicates low). Instead of a graphical representation, a simple numeric display of the count rates, or plot of the energy loss spectra, in each quadrant may be used. Furthermore, rather than display the individual count rate data to the user (e.g. using geometric blocks of the kind shown in FIGS. 6A and 6B), the display may simply indicate a direction in which to move the detector so that it points more towards the source. This may be calculated by the processing circuitry from the relative count rates. When the detector is pointing towards the source (i.e. when the processing circuitry deems the count rates associated with each scintillation body to be sufficiently similar) the display may indicate this, and, for example, an audio signal may also be given to alert the user.

It will be appreciated that in embodiments in which the user simply moves the detector to equalise the count rates associated with each scintillation body in order to determine the direction to the source, it is not necessary that the direction to the source of radiation is determined in terms of azimuth and co-latitude for any given detector orientation. This is because it is sufficient that the user is provided with feedback as to whether the detector is pointing at the source or not, and if not, in what direction the pointing axis P of the detector should be moved to ensure the detector is pointing towards the source.

It will be understood that the use of four scintillation bodies in a two-by-two square array is only one example configuration. For example, as described above, only two scintillation bodies may be used to determine the location of a source confined to a plane. More generally, three scintillation bodies will be sufficient to determine the direction to a source in three-dimensions. For example, referring to FIG. 2, one could determine the direction to a source's position projected onto the yz-plane based on the count rates associated with the first and second scintillation bodies 12A, 12B. Similarly, one could determine the direction to the source's position projected onto the xz-plane based on the count rates associated with the first and fourth scintillation bodies 12A, 12D. The direction of the source in three-dimensions can be determined from these two projected directions. Thus in this example the third scintillation body 12C is not required to determine the direction. Nonetheless, using four scintillation bodies as shown in FIG. 2 can be useful because it provides a degree of redundancy in the data and can also help maximise the amount of scintillator material in a given volume.

Figure 7A:
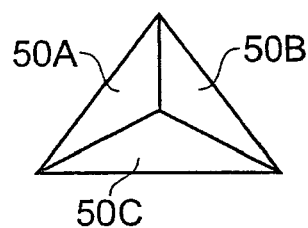
FIGS. 7A to 7C schematically shows plan views of gamma-ray detectors according to other embodiments of the invention.
Figure 7B:
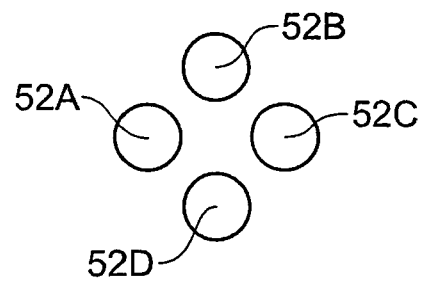
Figure 7C:
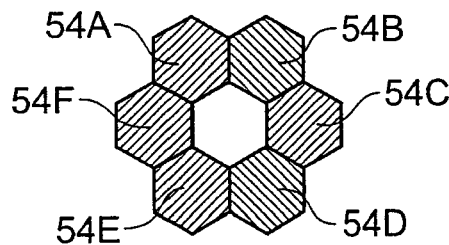

FIGS. 7A-7C are similar to, and will understood from FIG. 3A, but show other example configurations that may be employed in embodiments of the invention. FIG. 7A shows three scintillation bodies 50A-50C of triangular cross-section arranged in a triangular array. FIG. 7B shows four scintillation bodies 52A-52D of circular cross section arranged in a square array. FIG. 7C shows six scintillation bodies 54A-54F of hexagonal cross section arranged in a ring. If desired, an absorbing material, for example another scintillation body, can be positioned within the ring shown in FIG. 7C to increase the amount of direction dependent shielding. Where an additional scintillation body is used in the centre of the ring shown in FIG. 7C, it may be provided with a length that is shorter than those of the surrounding scintillation bodies 54A-54F. Thus the surrounding scintillation bodies act as a collimating shield for the central scintillation body. The central scintillation body will thus have improved sensitivity to variations in angular position of a source above the plane of FIG. 7C.

It will be appreciated that although the above examples have focussed on hand held detectors, the principles are also applicable to other scales of detector. For example larger (and hence more sensitive) "back-pack" mounted detectors, or even static detectors, employing the same principles may be employed.

Furthermore, it will be appreciated that any scintillation material, both organic and inorganic, may be used for the scintillation bodies. Different types of photo-detector may also be used in place of the PMTs employed in the examples described above. For example, avalanche photo-diodes, or silicon photomultipliers could equally be used.

Thus a portable gamma-ray detector for indicating the intensity of a source of gamma-rays, the nature of the source, and the direction to the source relative to an axis of the detector has been described. The detector comprises a plurality of scintillation bodies arranged around the pointing axis, for example four scintillation bodies in a two-by-two array, and separated from each other by aluminium foil. Other close packed/nested configurations of scintillation bodies may be used. Instead of aluminium foil a powder material, such as magnesium oxide, could be packed into the gaps between the scintillation bodies. Alternatively the scintillation bodies may be provided with a surface finish that promotes total internal reflection so that they are substantially optically isolated from one another without the need for an intervening optical shield. The arrangement of the scintillation bodies around the pointing axis of the detector is such that in use gamma-rays from different directions away from the pointing axis preferentially interact with different ones of the scintillation bodies. This is due to mutual shielding of one another by the scintillation bodies. Thus gamma-rays from different directions are shielded from different ones of the scintillation bodies by different ones of the other scintillation bodies. The scintillation bodies are coupled to respective photo-detectors and a processing circuit is configured to receive output signals from the photo-detectors and to provide an indication of the direction to a source relative to the pointing axis of the detector based on the relative output signals from the different photo-detectors. The processing circuit is further operable to determine the intensity of the source from the magnitudes of the output signals, and the nature of the source from a spectral analysis of the output signals.

REFERENCES

[1] Larssen, C., L., & Djeffal, S., *Development of a Directional Gamma Ray Probe*, Nuclear Science Symposium Conference Record 2005, I12EEE, Volume 1, pages 16-18
[2] WO 02/031536 (University of Southampton)

The invention claimed is:
1. A portable gamma-ray detector for indicating the direction to a source of gamma-rays, the detector comprising:
   a plurality of scintillation bodies respectively coupled to a corresponding plurality of photo-detectors, wherein the scintillation bodies are arranged around a pointing axis of the detector so that in use gamma-rays from different directions away from the pointing axis interact in a preferential manner with different ones of the scintillation bodies;
   a processing circuit operable to receive output signals from the photo-detectors and to provide an indication of the direction to a source relative to the pointing axis of the detector based on the output signals, the indication being based on a plurality of predetermined and differently sized geometric shapes,
   a display screen, wherein the processing circuit is operable to display a graphical indication of the direction to a source relative to the pointing axis of the detector on the display screen, the graphical indication comprising ones of the plurality of differently sized geometric shapes, wherein output signals from the photo-detectors are used to display corresponding ones of the plurality of predetermined and differently sized geometric shapes on the display screen, and
   wherein the processing circuit is further operable to generate one or more energy loss spectra from the output signals.

2. A portable gamma-ray detector according to claim 1, wherein the processing circuit is further operable to provide an indication of the intensity of a source based on the magnitudes of the output signals.

3. A portable gamma-ray detector according to claim 1, wherein the processing circuit is operable to perform a spectral analysis of the one or more energy loss spectra, and to identify the nature of the source based on the spectral analysis.

4. A portable gamma-ray detector according to claim 1, further comprising a light source for outputting a beam of light along the pointing axis of the detector.

5. A portable gamma-ray detector according to claim 1, wherein the plurality of scintillation bodies consists of four scintillation bodies arranged in a two-by-two array.

6. A portable gamma-ray detector according to claim 5, wherein the scintillation bodies are square in cross-section in a plane perpendicular to the pointing axis.

7. A portable gamma-ray detector according to claim 1, wherein the scintillation bodies are separated from one another by a layer of optically opaque material.

8. A portable gamma-ray detector according to claim 7, wherein the optically opaque material is a metallic foil.

9. A portable gamma-ray detector according to claim 1, wherein the photo-detectors comprise photo-multiplier tubes.

10. A portable gamma-ray detector according to claim 1, wherein the photo-detectors comprise silicon photo-multiplier devices.

11. A method of obtaining an indication of the direction to a source of gamma-rays, the method comprising:
   providing a plurality of scintillation bodies arranged around a pointing axis so that gamma-rays from different directions away from the pointing axis interact in a preferential manner with different ones of the scintillation bodies;
   obtaining output signals from a plurality of photo-detectors coupled to respective ones of the plurality of scintillation bodies;
   providing a graphical indication of the direction to the source relative to the pointing axis based on the output signals, wherein the graphical indication comprises ones of the plurality of predetermined and differently sized geometric shapes, wherein output signals from the photo-detectors are used to display corresponding ones of the plurality of predetermined and differently sized geometric shapes, and generating one or more energy loss spectra from the output signals.

12. A method according to claim 11, further comprising determining the intensity of the source from the magnitudes of the output signals.

13. A method according to claim 12, further comprising performing a spectral analysis of the one or more energy loss spectra, and identifying the nature of the source from the spectral analysis.

14. A method according to claim 11, further comprising outputting a beam of light along the pointing axis.

* * * * *